US008221873B2

(12) United States Patent
Nagao et al.

(10) Patent No.: US 8,221,873 B2

(45) Date of Patent: Jul. 17, 2012

(54) FILM SLITTER, FILM AND FILM SLITTING METHOD

(75) Inventors: Eijiro Nagao, Kanagawa (JP); Osamu Noguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 285 days.

(21) Appl. No.: 12/569,696

(22) Filed: Sep. 29, 2009

(65) Prior Publication Data

US 2010/0080974 A1 Apr. 1, 2010

(30) Foreign Application Priority Data

Sep. 30, 2008 (JP) ................................ 2008-255701

(51) Int. Cl.

| | |
|---|---|
| ***B23D 19/06*** | (2006.01) |
| ***B26D 1/24*** | (2006.01) |
| ***B32B 27/06*** | (2006.01) |
| ***G03G 5/00*** | (2006.01) |

(52) U.S. Cl. ........... 428/220; 428/422; 83/425.4; 83/56; 83/500

(58) Field of Classification Search .................. 428/220, 428/422; 83/425.4, 56, 500

See application file for complete search history.

(56) References Cited

U.S. PATENT DOCUMENTS 5,873,293 A * 2/1999 Yamazaki ....................... 83/497

5,899,129 A * 5/1999 Sumida et al. ................. 83/76.9

FOREIGN PATENT DOCUMENTS

JP 7-88796 4/1995

* cited by examiner

*Primary Examiner* — David Sample

*Assistant Examiner* — Tahseen N Khan

(74) *Attorney, Agent, or Firm* — McGinn IP Law Group, PLLC

(57) ABSTRACT

A multi-head film slitter slits wide film having a photosensitive emulsion layer oriented upwards to produce motion picture film. A lower rotary blade has a lower cutting edge. An upper rotary blade has an upper cutting edge, for shearing the wide film with the lower cutting edge. The upper and lower cutting edges are overlapped partially, and contact one another in a position downstream in a running direction of the wide film. A clearance is provided between the upper and lower cutting edges in a position upstream in the running direction. Also, a lower blade shaft rotates the lower blade. An upper blade shaft is disposed higher than the lower blade shaft, for rotating the upper blade. The clearance is provided by inclining the upper blade shaft on a plane on which the upper blade shaft lies and which is parallel with the wide film.

15 Claims, 7 Drawing Sheets

FILM SLITTER, FILM AND FILM SLITTING METHOD

BACKGROUND OF THE INVENTION

1. Field of the Invention

The present invention relates to a film slitter, film and film slitting method. More particularly, the present invention relates to a film slitter, film and film slitting method in which sectional outlines of the film formed by shearing for slitting can be neatly formed and can be free from unwanted abrasion or the like.

2. Description Related to the Prior Art

Continuous photosensitive material such as motion picture film is produced by slitting from the web or continuous sheet with a great width. The web is initially supplied in a roll form with its emulsion layer directed outwards, and is unwound at a regular speed and passed between upper and lower rotary blades. In FIG. 8, a multi-head film slitter has an upper rotary blade 2 of a circular form, which includes a plurality of blade elements arranged regularly in compliance with the number of the strips and the total width. In combination with this, a lower rotary blade 3 of a circular form is disposed and includes plural blade elements. Web 5 or continuous sheet is supported by the lower rotary blade 3 in a slitting area. To this end, the lower rotary blade 3 has a multi-drum form of rotary dies with sufficient areas for support.

When the web 5 is run in the arrow direction in the drawing, an upper blade shaft 2*a* supporting the upper rotary blade 2 rotates together with a lower blade shaft 3*a* supporting the lower rotary blade 3 at the same time. A surface of the upper rotary blade 2 directed in a forward direction and a surface of the lower rotary blade 3 directed in a backward direction are kept in contact with one another by positioning the upper and lower blade shafts 2*a* and 3*a* for contact in an overlap region of the upper and lower rotary blades 2 and 3 predetermined with reference to a running direction of the web 5. Various support mechanisms for the upper rotary blade 2 are known. U.S. Pat. No. 5,873,293 (corresponding to JP-A 7-088796) discloses a structure for biasing the upper rotary blade 2 in the axial direction of the upper blade shaft 2*a* to maintain its contact with the lower rotary blade 3.

The upper and lower rotary blades 2 and 3 are supported vertically to an axial direction of the upper and lower blade shafts 2*a* and 3*a*. The upper and lower blade shafts 2*a* and 3*a* are disposed to extend perpendicularly to the running direction of the web 5. The web 5 is slitted by shearing while passed between the upper and lower rotary blades 2 and 3, so that continuous photo films 6 as elongate strips are formed at a regular width. A winding reel winds each of the continuous photo films 6. Note that selvedge portions 7 are formed from the web 5 beside the continuous photo film 6, and are discarded.

In FIGS. 9A, 9B and 9C, states of slitting are illustrated. Beveled surfaces 2*b* and 3*b* of a cutting edge are formed with respectively the upper and lower rotary blades 2 and 3. When the web 5 comes in the slitting area between the upper and lower rotary blades 2 and 3, the upper rotary blade 2 moves down in a direction from an emulsion layer 8 toward a film support 9. After the continuous photo film 6 is slitted by the upper rotary blade 2 as depicted in FIG. 9C, vertical surfaces of the upper and lower rotary blades 2 and 3 contact one another.

In FIGS. 10A and 10B, the continuous photo film 6 obtained by slitting is illustrated as viewed in a section taken on a line perpendicular to the running direction of the continuous photo film 6. In FIG. 10A, a shape obtained by slitting of the upper rotary blade 2 is depicted. In FIG. 10B, a shape obtained by slitting of the lower rotary blade 3 is depicted. In FIG. 10A, a sectional outline 6*a* is defined on a first one of two lateral edges of the continuous photo film 6. In FIG. 10B, a sectional outline 6*b* is defined on a second one of the lateral edges. Each one of the continuous photo film 6 obtained by slitting comes to have the sectional outlines 6*a* and 6*b*. On the sectional outline 6*a* on the upper blade side, an edge portion of the film support 9 protrudes from an edge portion of the emulsion layer 8 in a lower portion as viewed in the thickness direction. On the sectional outline 6*b* on the lower blade side, an edge portion of the film support 9 protrudes from an edge portion of the emulsion layer 8 at the center as viewed in the thickness direction.

In short, the sectional outlines along the lateral edges of the continuous photo film 6 are in the different shapes as a product slitted in the known film slitter. There arises a problem in the continuous photo film 6 of which an edge burr of the film support 9 occurs and protrudes laterally in an example of continuous film such as motion picture film. The edge burr of the film support 9 is likely to rub a flange of an winding reel or idler wheel for use in the movie projection for a long time. Fine dust or particles will be created and scattered in the course of abrasion.

Examples of motion picture films of 35 mm width include a camera film, duplicating film (intermediate film) and print film. At first, images are photographed on the camera film as original film. The duplicating film is used for duplication by use of the camera film. Then the print film is used to produce prints for the purpose of movie projection. Printers of specified purposes are used for printing of any of motion picture films. In FIGS. 11A and 11B, examples of device for printing operation are illustrated, including a winding reel 10 with a flange 10*a*, and an idler wheel 11 or idler reel with a flange 11*a*. In FIG. 11A, it is likely that the continuous photo film 6 is wound about the winding reel 10 with skew to the flange 10*a*. In FIG. 11B, a transport direction of the continuous photo film 6 slightly changes so that an edge of the continuous photo film 6 is rubbed by the flange 11*a*.

The duplicating film and the print film having the emulsion layer are wound in the roll form. There are predetermined directions of the duplicating film and the print film for operation of duplication and printing in the art of the motion picture film, the directions including a running direction, winding direction, and opposing direction between the films. In a structure to transport the continuous photo film 6 in a printer, an end face of a first lateral edge of the continuous photo film 6 supported by the lower rotary blade 3 comes to contact the flange 10*a* or 11*a* without contact of a second lateral edge of the continuous photo film 6 formed by slitting with the upper rotary blade 2. In FIG. 10B, the sectional outline 6*b* on the side supported by the lower rotary blade 3 has an edge burr as a portion of the film support 9 of PET protruding remarkably in a projecting position B at the center. Fine dust or particles are likely to occur in frictional contact with the flange 10*a* or 11*a*, to break a mechanism for transporting the continuous photo film 6, or to contaminate the continuous photo film 6.

SUMMARY OF THE INVENTION

In view of the foregoing problems, an object of the present invention is to provide a film slitter, film and film slitting method in which sectional outlines of the film formed by shearing for slitting can be neatly formed and can be free from unwanted abrasion or the like.

In order to achieve the above and other objects and advantages of this invention, a film slitter slits wide film having a photosensitive emulsion layer oriented upwards into film of a narrow form. A lower rotary blade has a lower cutting edge. An upper rotary blade has an upper cutting edge, for shearing the wide film in cooperation with the lower cutting edge. The upper and lower cutting edges are overlapped with one another partially, and contact one another in a position downstream in a running direction of the wide film, wherein a clearance is provided between the upper and lower cutting edges in a position upstream in the running direction.

Furthermore, a first blade shaft rotates a first one of the upper and lower rotary blades. A second blade shaft rotates a second one of the upper and lower rotary blades. The clearance is provided by finely inclining the first blade shaft on a plane on which the first blade shaft lies and which is parallel with the wide film.

A skew angle defined between the upper and lower blade shafts in images projected orthogonally on a plane parallel with the wide film is 0.08-0.12 degree.

Preferably, the skew angle is 0.1-0.11 degree.

Furthermore, an adjuster supports the first shaft in a rotatable manner about an intermediate point in the first shaft, to adjust skew thereof relative to a second one of the upper and lower blade shafts.

The wide film includes a film support, overlaid with the emulsion layer, and formed from polyethylene terephthalate, and the wide film has a thickness of 0.1-0.4 mm.

The clearance is 25-38 microns.

Preferably, the clearance is 29.4-33.6 microns.

Also, a film obtained by slitting in a film slitter from wide film is provided, the film slitter including a lower rotary blade having a lower cutting edge, and an upper rotary blade having an upper cutting edge, for shearing the wide film having a photosensitive emulsion layer oriented upwards in cooperation with the lower cutting edge. The film includes a pair of lateral edges each of which is formed by shearing of the wide film with the upper and lower cutting edges, wherein the upper and lower cutting edges are overlapped with one another partially, and contact one another in a position downstream in a running direction of the wide film, wherein a clearance is provided between the upper and lower cutting edges in a position upstream in the running direction.

The wide film includes a film support, overlaid with the emulsion layer, and formed from polyethylene terephthalate, and the wide film has a thickness of 0.1-0.4 mm.

Also, there is a film slitting method of slitting wide film having an emulsion layer oriented upwards by use of a lower rotary blade having a lower cutting edge, and an upper rotary blade having an upper cutting edge, for shearing the wide film in cooperation with the lower cutting edge. The film slitting method has a step of providing a clearance between the upper and lower cutting edges in a position upstream in a running direction of the wide film by keeping the upper and lower cutting edges in contact with one another in a position downstream in the running direction, the upper and lower cutting edges being overlapped with one another partially.

The clearance is provided by finely inclining at least one of the upper and lower cutting edges on a plane parallel with the wide film.

A skew angle defined between the upper and lower cutting edges in images projected orthogonally on a plane parallel with the wide film is 0.08-0.12 degree.

The clearance is 25-38 microns.

Accordingly, sectional outlines of the film formed by shearing for slitting can be neatly formed and can be free from unwanted abrasion or the like.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
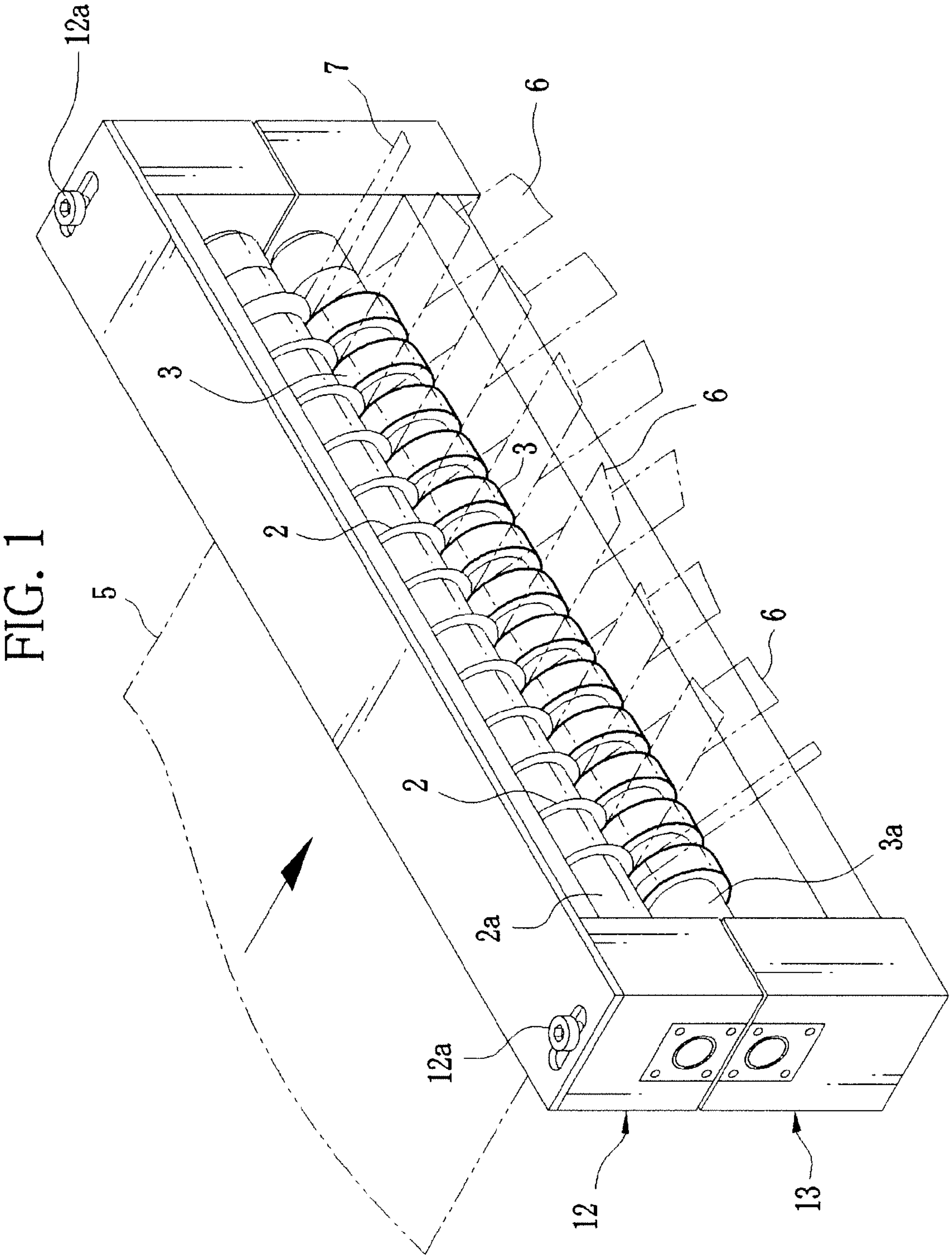
FIG. 1 is a perspective view illustrating a multi-head film slitter of the invention.

In FIG. 1, a multi-head film slitter of the invention is illustrated. Wide film 5 or continuous sheet is run in the direction indicated by the arrow in a state of orienting its emulsion surface upwards. An upper rotary blade 2 and a lower rotary blade 3 of circular forms are disposed and opposed to one another, between which the wide film 5 passes and is sheared and slitted into continuous photo films 6 as a plurality of elongate strips. A winding reel is disposed and winds each of the continuous photo films 6. Selvedge portions of the continuous photo films 6 are removed by slitting and discarded. The wide film 5 is for the purpose of producing so-called print film in the field of the motion picture film. A support of the wide film 5 is formed from polyethylene terephthalate (PET). An emulsion layer is formed on the wide film 5 and has a thickness of 5-30 microns. A total thickness of the wide film 5 is 0.1-0.4 mm. A speed of running the wide film 5 is controlled in a range of 30-300 meters per minute.

In the upper and lower rotary blades 2 and 3, first to Nth upper rotary blade elements of an array are opposed to respectively first to Nth lower rotary blade elements of an array in one common direction.

Figure 8:
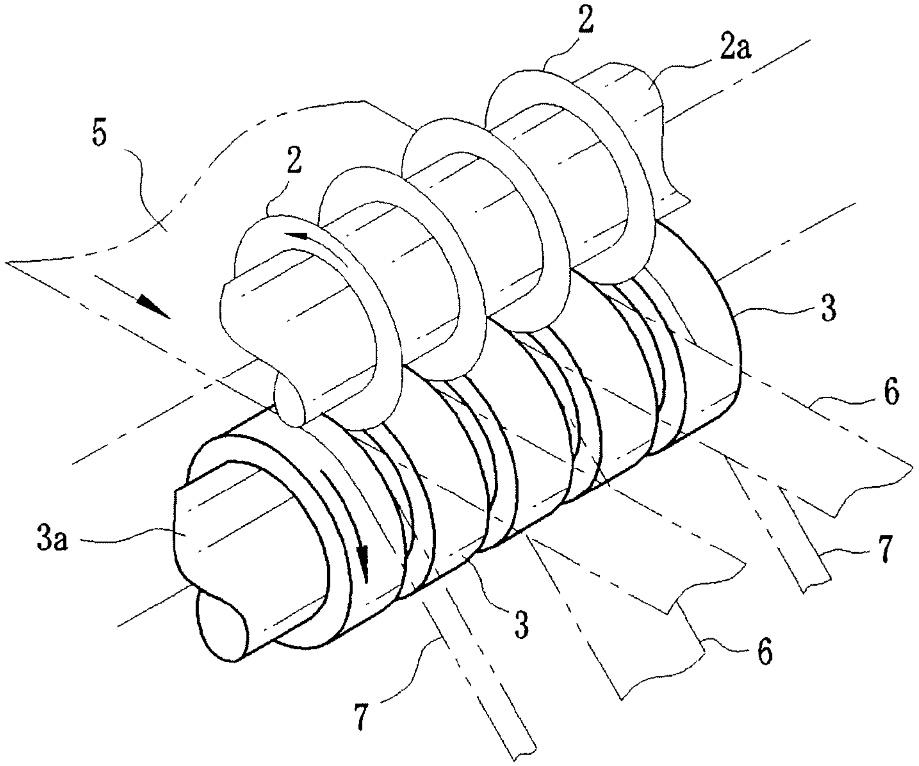
FIG. 8 is a perspective view illustrating a known film slitter of the prior art.

A lower blade shaft 3*a* supports the lower rotary blade 3 connected fixedly, and rotates together in the counterclockwise direction. There is an upper blade shaft 2*a* on which a blade supporting mechanism associated with the upper rotary blade 2 biases this to the lower rotary blade 3 suitably for shear. The upper blade shaft 2*a* rotates together with the upper rotary blade 2 in the clockwise direction. A preferable outer diameter of the upper and lower rotary blades 2 and 3 is in a range of 100-200 mm for use with the wide film 5 of the above-described thickness. The upper rotary blade 2 has a form of a disk with a small thickness. In contrast, the lower rotary blade 3 is rotary dies of a multi-drum form with a width for supporting a lower surface of the wide film 5 in a slitting position. (See FIG. 8.)

There is an upper blade assembly 12 with a blade housing in which the upper blade shaft 2*a* is supported in a rotatable manner. In a lower blade assembly 13 with a blade housing, the lower blade shaft 3*a* is supported in a rotatable manner. Each of the upper and lower blade shafts 2*a* and 3*a* extends in parallel with the wide film 5. A driving mechanism is associated with one of the upper and lower blade assemblies 12 and 13, including a motor, timing belt and the like. The driving mechanism is actuated to rotate the upper and lower rotary blades 2 and 3 in synchronism at a constant ratio of the rotational speed.

Figure 2:
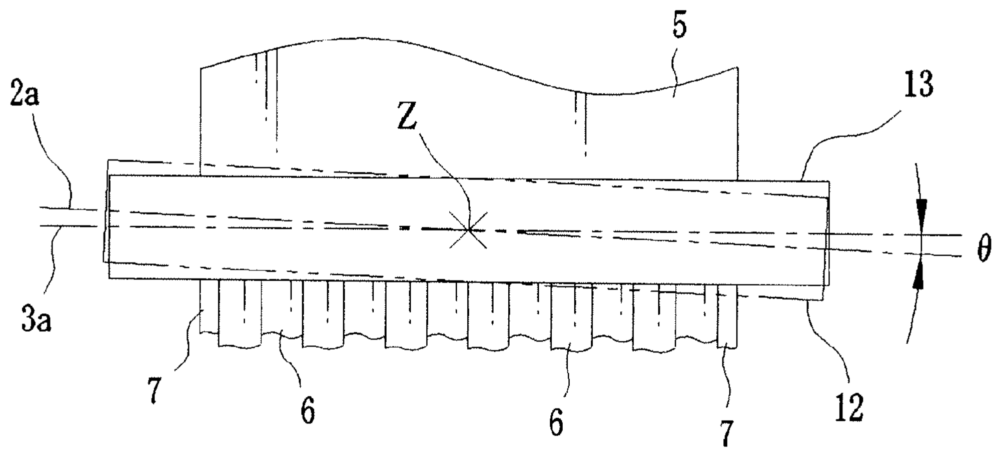
FIG. 2 is a plan illustrating a lower blade assembly and an upper blade assembly inclined relative thereto.

The upper blade assembly 12 is connected with the lower blade assembly 13 for the upper blade shaft 2*a* to intersect with the lower blade shaft 3*a* by fine skew on a plane which is parallel with the wide film 5. The lower blade shaft 3*a* is constantly perpendicular to a running direction of the wide film 5 as viewed downwards vertically. In contrast, the upper blade shaft 2*a* is disposed to extend with fine skew with a local shift in a running direction. Specifically, the upper blade shaft 2*a* is shiftable with fine skew relative to the lower blade shaft 3*a* on a plane parallel with the wide film 5. Projection images of the upper and lower blade shafts 2*a* and 3*a*, when those are projected orthogonally on the plane parallel with the wide film 5, intersect with one another. Adjustment bolts 12*a* as an adjuster are associated with ends of the upper blade assembly 12. The fine skew of the upper blade assembly 12 is adjusted by loosening and tightening the adjustment bolts 12*a*, so that the upper blade shaft 2*a* is fixedly set up with a desired skew angle relative to the lower blade shaft 3*a* on a projection plane parallel with the wide film 5. In FIG. 2, the upper blade assembly 12 is inclined in the clockwise direction with an angle θ with an intersection point Z where one blade element of the lower rotary blade 3 slits a center of the wide film 5 in the transverse direction.

Figure 3A:
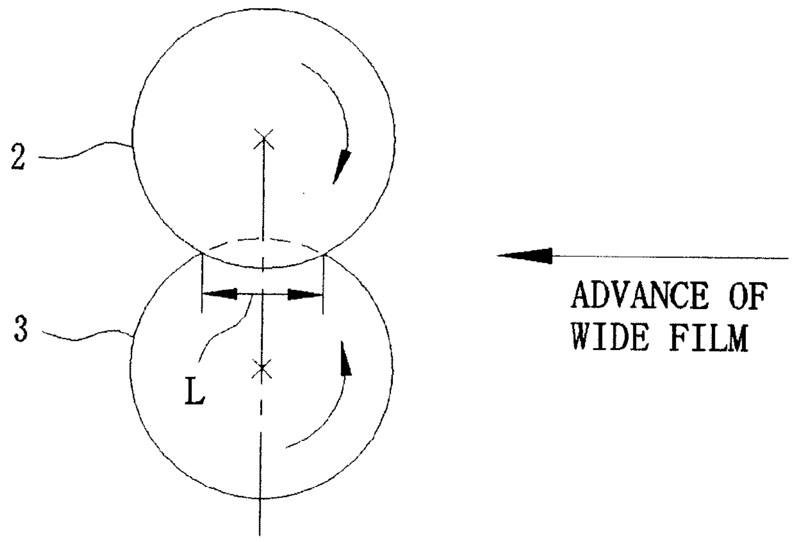
FIG. 3A is a side elevation illustrating upper and lower rotary blades.
Figure 3B:
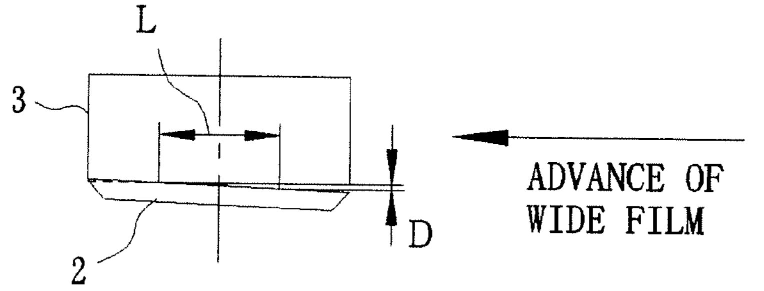
FIG. 3B is an explanatory view in a plan illustrating the same as FIG. 3A.

For setup, the upper and lower blade shafts 2*a* and 3*a* are set in parallel with one another as illustrated in FIG. 3A to keep cutting edges of the upper and lower rotary blades 2 and 3 in an overlapped state in an overlap region L or facing region. The upper blade assembly 12 is adjusted for the fine skew. Then the upper rotary blade 2 comes in contact with the lower rotary blade 3 in a position downstream from the cutting edges with reference to the running direction of the wide film 5. Pushing force is applied to the upper rotary blade 2 by contact with the side of the lower rotary blade 3 in an axial direction of the upper blade shaft 2*a*. However, the upper rotary blade 2 is biased to contact the lower rotary blade 3 with resiliency, and also supported to keep a vertical direction on the upper blade shaft 2*a*. The upper rotary blade 2 is inclined relative to the lower rotary blade 3 as illustrated in FIG. 3B, to provide a clearance D in the position upstream from the slitting position of the cutting edges. The clearance D gradually decreases downstream in the running direction, and comes down to zero at the extremity of the overlap region L of the contact between the upper and lower rotary blades 2 and 3.

Figures 9A, 9B, 9C:
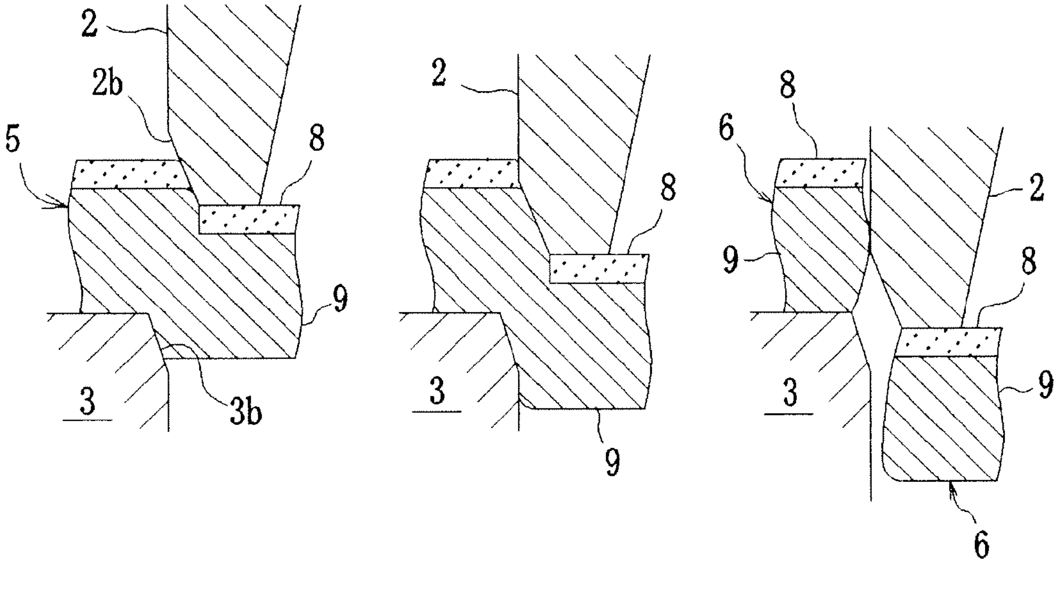
FIGS. 9A, 9B and 9C are vertical sections illustrating a process of slitting in the film slitter of FIG. 8.

As is clarified in FIG. 2, a right portion of the upper blade shifts downstream in the running direction of the wide film 5 because the intersection point Z is positioned at the center of the upper blade shaft 2*a*. A left portion of the upper blade shifts upstream. However, blade elements of the upper rotary blade 2 on the left side come in contact with the lower rotary blade 3 on the downstream side, as the skew angle θ is as small as 0.1 degree. Note that the contact positions and the clearance D are finely different in areas distant from the intersection point Z, the contact positions including those of contact of the upper and lower blades as viewed in the running direction. However, their differences are negligibly small and are free from problems in view of effects of the present invention. In FIGS. 9A, 9B and 9C, beveled surfaces 2*b* and 3*b* of the cutting edges are formed with respectively the upper and lower rotary blades 2 and 3. An interval between the cutting edges of the upper and lower rotary blades 2 and 3 is larger than the clearance D in the vicinity of the intersection point Z, because vertical surfaces of the upper and lower rotary blades 2 and 3 contact one another beside the beveled surfaces 2*b* and 3*b*.

As the upper blade assembly 12 is conditioned with the fine skew, the advance of the wide film 5 into a slitting area where the blades are overlapped in the overlap region L or facing region, a crack S occurs in the wide film 5 in a tilt direction by pressure of the upper rotary blade 2 in an initial phase between the upper and lower rotary blades 2 and 3, because of the clearance D and the beveled surfaces 2*b* and 3*b*. See FIG. 4. With the advance of the wide film 5, the clearance between the upper and lower rotary blades 2 and 3 decreases in the running direction. Shortly before the wide film 5 comes to a position of contact between their vertical surfaces, shearing for slitting is completed. Note that the beveled surface 2*b* of the upper rotary blade 2 is defined by sizes X and Y indicated in the drawing. For the purpose of keeping the clearance D as high as 30 microns between the upper and lower rotary blades 2 and 3 by the fine skew between the upper and lower blade assemblies 12 and 13, it is preferable in the upper rotary blade 2 that X=4 microns and Y=25 microns.

Figure 5:
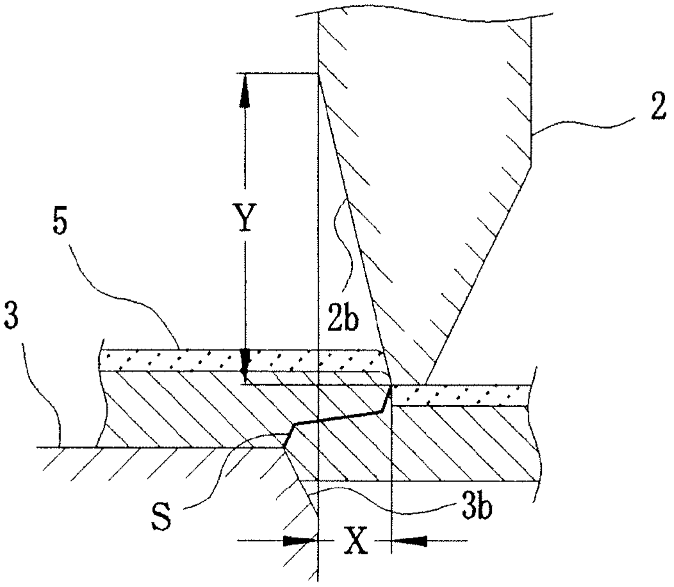
FIG. 5 is a vertical section illustrating beveled surfaces of the upper and lower rotary blades.

As vertical surfaces of the upper and lower rotary blades 2 and 3 contact one another, a clearance of X=30 microns can be maintained between the upper and lower rotary blades 2 and 3 at the cutting edges as illustrated in FIG. 5 by use of the upper rotary blade 2 having X=30 microns and Y=180 microns, even without skew between the upper and lower blade shafts 2*a* and 3*a*. It is possible to provide a clearance on an upstream side from the overlap region L in a similar manner if the overlap region L between the upper and lower rotary blades 2 and 3 is sufficiently large in compliance with the size Y. It is to be noted that the upper and lower blade assemblies 12 and 13 should be preferably inclined relative to one another to provide the clearance D in consideration of possible abrasion of the upper and lower rotary blades 2 and 3.

As the N upper rotary blade elements are opposed to respectively N lower rotary blade elements in their common direction, sectional outlines of shapes of the continuous photo films 6 are formed regularly on first and second lateral edges respectively associated therewith.

Figure 4:
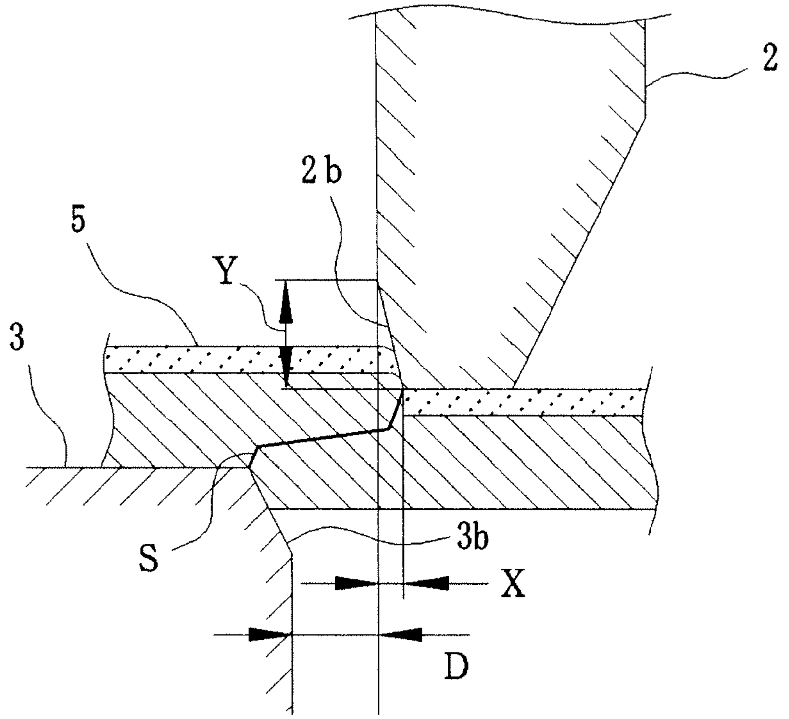
FIG. 4 is a vertical section illustrating film slitting of wide film by upper and lower rotary blades.
Figures 6A, 6B:
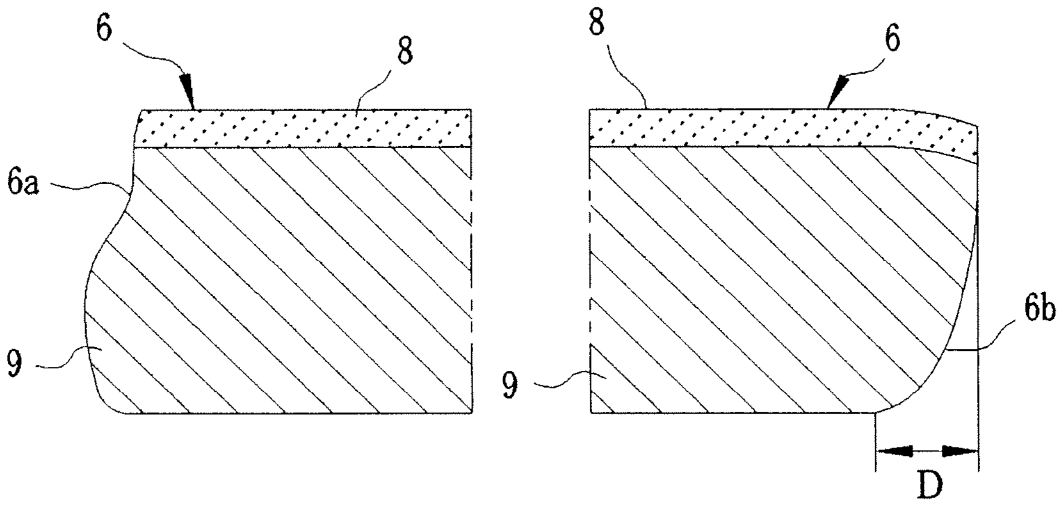
FIG. 6A is a cross section illustrating a first lateral edge of continuous photo film obtained by the film slitter.
FIG. 6B is a cross section illustrating a second lateral edge of the continuous photo film obtained by the film slitter.
Figure 10A:
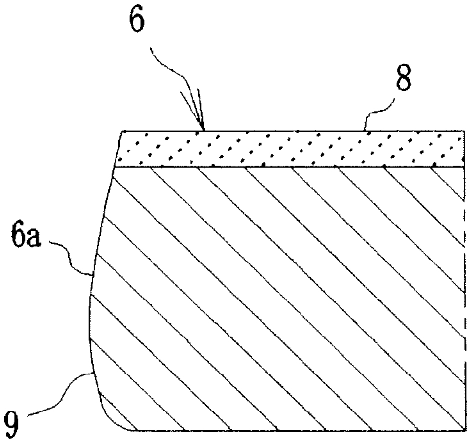
FIGS. 10A and 10B are cross sections illustrating the continuous photo film obtained by slitting in the known film slitter.
Figure 10B:
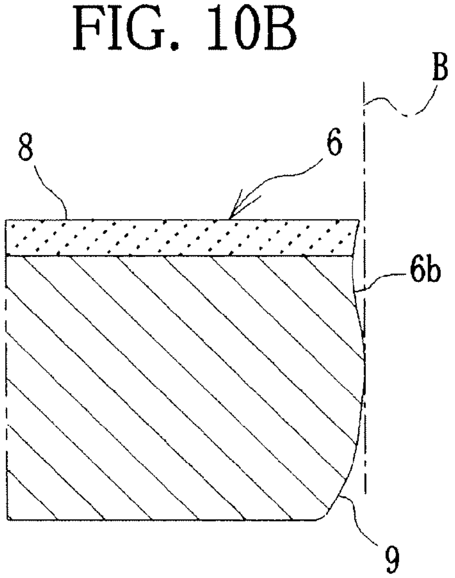

In FIGS. 6A and 6B, sectional forms of the continuous photo film 6 with sectional outlines obtained by slitting with the upper and lower rotary blades 2 and 3 of FIG. 4 are illustrated, in the shape taken on the line perpendicular to the running direction, in a manner similar to the forms of FIGS. 10A and 10B. In FIG. 6A, the form of a portion cut by the upper rotary blade 2 (on the upper blade side) is depicted. In FIG. 6B, the form of a portion cut by the lower rotary blade 3 (on the lower blade side) is depicted. Sectional outlines 6*a* and 6*b* appear on the lateral edges. The film has a film support 9 and an emulsion layer 8 overlaid on the film support 9. In view of comparison with the forms of FIGS. 10A and 10B according to the prior art, the sectional outline 6*a* on the upper blade side has a portion of the film support 9 protruding remarkably from a portion of the emulsion layer 8. In contrast, the sectional outline 6*b* on the lower blade side has a portion of the film support 9 nearly flush with a portion of the emulsion layer 8 without protrusion. No edge burr occurs on the lateral edge of the continuous photo film 6 along the sectional outline 6*b*. When the clearance D is 30 microns or so, an edge portion of the film support 9 on the lower blade side becomes shaped to retreat from an edge portion of the emulsion layer 8 by a distance E. As a result, the distance E is approximately equal to the clearance D.

Figure 11A:
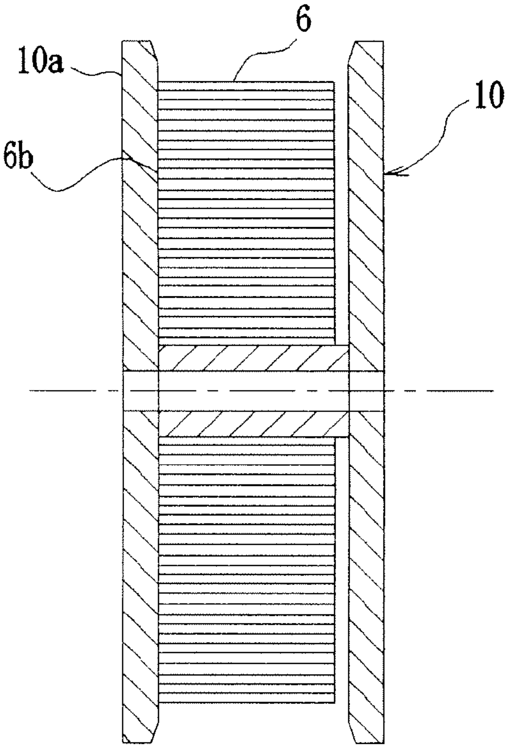
FIG. 11A is a vertical section illustrating contact of only one lateral edge of the continuous photo film with a flange of a winding reel.
Figure 11B:
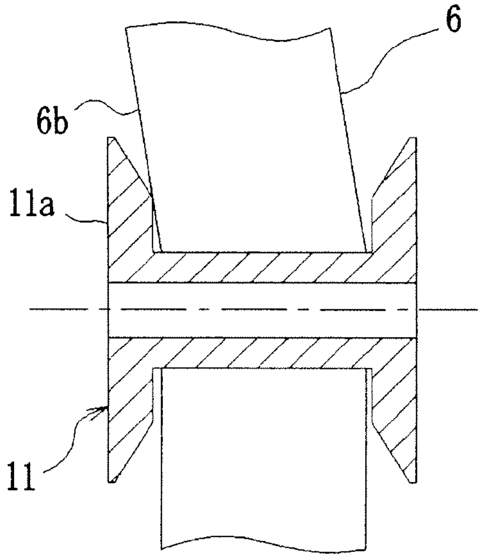
FIG. 11B is a vertical section illustrating contact of only one lateral edge of the continuous photo film with a flange of an idler wheel.

In FIGS. 11A and 11B, examples of device for a combined use with the film of the invention are illustrated, including a winding reel 10 with a flange 10*a*, and an idler wheel 11 or idler reel with a flange 11*a*. In the film described above, an edge portion of the film support 9 is kept flush with an edge portion of the emulsion layer 8 on the side of the operation of the lower blade assembly 13 in slitting. The film support 9 will not be rubbed even through the emulsion layer 8 is rubbed. On a sectional outline of the film on the upper blade side, a portion of the film support 9 protrudes from a portion of the emulsion layer 8. However, the sectional outline on the upper blade side will not frictionally contact the flange 10*a* or 11*a*, and will not cause problems. Accordingly, no dust or fine powder of the film support 9 due to edge burr will scatter even when the film is used in a printer or projector for a long time. The feature of the invention is effective in maintaining a good condition of use of the film.

Figure 7A:
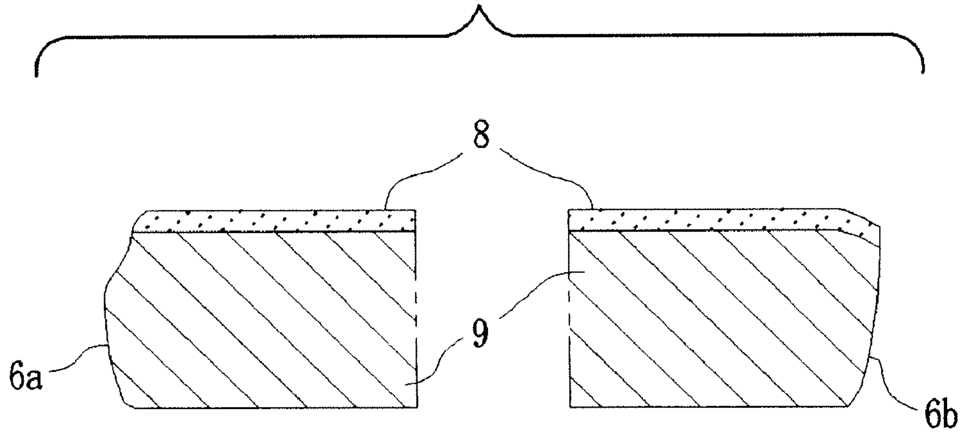
FIG. 7A is a cross section, partially broken, illustrating sectional outlines of the continuous photo film after the film slitting conditioned with a first clearance.
Figure 7B:
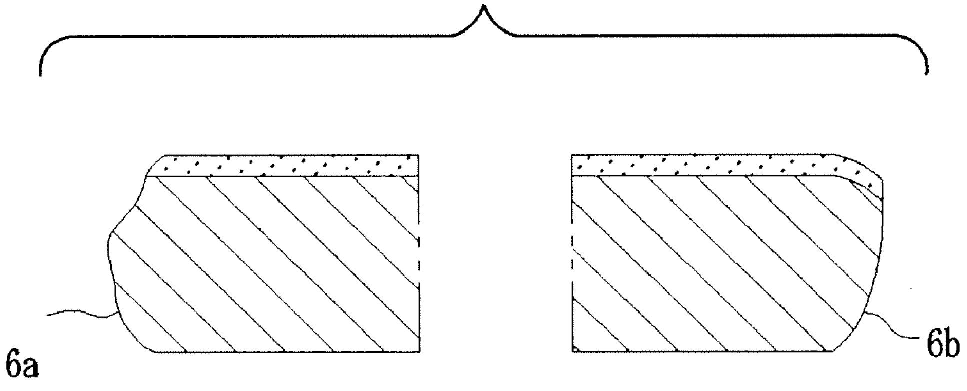
FIG. 7B is a cross section, partially broken, illustrating sectional outlines of the continuous photo film after the film slitting conditioned with a second clearance greater than the first clearance.
Figure 7C:
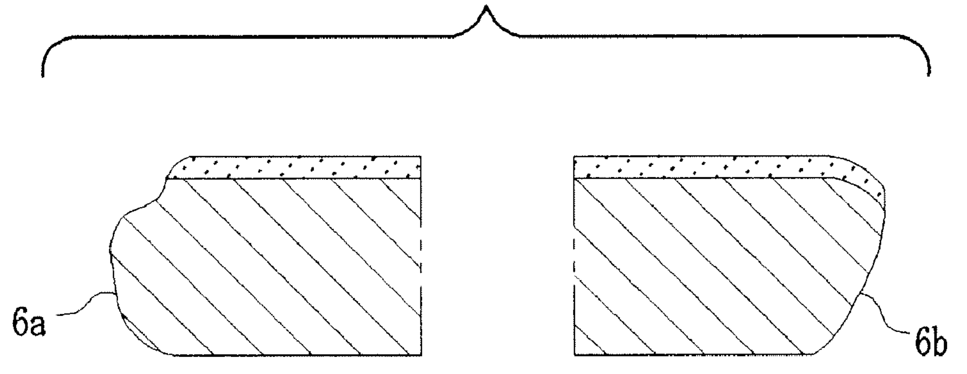
FIG. 7C is a cross section, partially broken, illustrating sectional outlines of the continuous photo film after the film slitting conditioned with a third clearance greater than the third clearance.

In Table 1, results of the evaluation are indicated according to examples of an experiment with changes in the skew angle θ between the upper and lower blade shafts 2*a* and 3*a*. The wide film to slit was so-called print film in the field of the motion picture film, and included the film support of PET (polyethylene terephthalate). A thickness of the wide film was 0.1-0.4 mm. An outer diameter of the blades was in a range of 100-200 mm. The skew angle θ was indicated with a gradient as a ratio of the length of the wide film 5 to its width as viewed in the running direction. In addition, angles in the unit of degrees were indicated in the parenthesis. The clearance D was taken from a position nearest to the intersection point Z between blade elements of the upper and lower rotary blades 2 and 3. The sign L denotes the lower blade side. The sign U denotes the upper blade side. In FIGS. 7A, 7B and 7C, forms of the sectional outlines of the film are illustrated as results of slitting in Examples 1, 3 and 5 of Table 1.

TABLE 1

| | | Examples | | | | |
|---|---|---|---|---|---|---|
| | | 1 | 2 | 3 | 4 | 5 |
| Skew angle θ (mm) | | 3/2000 (0.085 deg.) | 3.5/2000 (0.100 deg.) | 3.75/2000 (0.107 deg.) | 4/2000 (0.115 deg.) | 4.5/2000 (0.129 deg.) |
| Clearance (microns) | D | 25.2 | 29.4 | 31.5 | 33.6 | 37.8 |
| Performance of shear (unused blades) | L | B | B | A | A | B |
| | U | B' | B | A | A | B |
| Performance of shear (used blades) | L | A | A | A | A | A |
| | U | A | A | A | A | A |
| Evaluation | | A | A | AA | A | A |

The skew angle θ was set stepwise with 5 steps in a range from 3/2000 (0.085 degree) to 4.5/2000 (0.129 degree). It was observed that the unevenness of the sectional outlines 6*a* and 6*b* increased according to the greatness of the skew angle θ. In any of those examples, the lateral edge of the film support 9 was free from an edge burr on the sectional outline 6*b*, as the edge portion of the film support 9 did not protrude from the edge portion of the emulsion layer 8 on the sectional outline 6*b* on the lower blade side. Thus, the purpose of the construction was achieved. Note that the running speed of the wide film was experimentally changed in a range of 30-300 meters per minute. There was no significant differences as a result of observation and evaluation.

In Table 1, the performance of cutting was evaluated with three grades of A (very good), B (sufficiently good for use) and C (failing) and in two conditions including one immediately after exchange of the upper and lower rotary blades 2 and 3 as unused blades and used blades in an abraded state after repeated use. As a result, no problem was found in any of the examples. Note that when unused blades were used in Example 5, a small problem occurred as white dust was found present on the continuous photo film on the lower blade side immediately after slitting. However, completely no problem occurred in the use of the used blades in Example 5. It is concluded that slitting for test can be carried out with Example 5 immediately after exchange for unused blades, and that slitting for the proper purpose can be subsequently carried out for producing products, so as to utilize Example 5 safely without problem.

In view of the above observation, it is unexpectable to obtain better results even if the skew angle θ is set smaller than in Example 1 or set greater than in Example 5. Thus, it is preferable that the skew angle θ is in a range of 0.08-0.12 degree, and that the clearance D is in a range of 25-38 microns. It is desirable that the skew angle θ is in a range of 0.1-0.11 degree, and that the clearance D is in a range of 29.4-33.6 microns, as values close to the values of Example 3.

Note that according to certain types of films, good slitting may be carried out preferably without skew angle between the upper and lower blade shafts. A structure in which the upper blade shaft is adjustable for skew with the lower blade shaft as described above is preferably used, so as to utilize the film slitter of the invention for such types of films. A specialized film slitter with a predetermined skew angle may be prepared. It is possible to fix the upper rotary blade by keeping the upper blade shaft with a predetermined angle and in a state of the upper and lower blade shafts parallel with one another. If a required condition is satisfied, it is possible according to the invention to set the upper blade shaft perpendicular to a running direction of the wide film and to incline the lower blade shaft relative to the upper blade shaft with a skew angle.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A film slitter for slitting a wide film comprising a photosensitive emulsion layer oriented upwards into a film of a narrow form, said film slitter comprising:

a lower rotary blade comprising a lower cutting edge;

an upper rotary blade comprising an upper cutting edge, for shearing said wide film in cooperation with said lower cutting edge; and a motor for rotating said upper and lower rotary blades, wherein said upper and lower cutting edges are overlapped with one another partially, and contact one another in a position downstream in a running direction of said wide film, wherein a clearance is provided between said upper and lower cutting edges in a position upstream in said running direction, and wherein said motor rotates said upper and lower rotary blades such that said upper and lower cutting edges move in a direction from said position upstream to said position downstream at a position where said wide film is sheared, and that said wide film is nipped between said upper and lower rotary blades, and then said wide film is sheared by said upper and lower cutting edges.

2. A film slitter as defined in claim 1, further comprising:

a first blade shaft for rotating a first one of said upper and lower rotary blades; and a second blade shaft for rotating a second one of said upper and lower rotary blades, wherein said clearance is provided by finely inclining said first blade shaft on a plane on which said first blade shaft lies and which is parallel with said wide film.

3. A film slitter as defined in claim 1, wherein said wide film includes a film support, comprising polyethylene terephthalate, for supporting said emulsion layer, and said wide film has a thickness of 0.1-0.4 mm.

4. A film slitter as defined in claim 1, wherein said clearance is 25-38 microns.

5. A film slitter as defined in claim 1, wherein said clearance is provided in a film entering side of the film slitter.

6. A film slitter as defined in claim 1, wherein said position upstream is provided in a film entering side of the film slitter.

7. A film slitter as defined in claim 1, wherein the clearance on said position upstream forms slitted film edges that are non-perpendicular to a surface of the wide film.

8. A film slitter as defined in claim 2, wherein a skew angle defined between said first and second blade shafts in images projected orthogonally on a plane parallel with said wide film is 0.08-0.12 degree.

9. A film slitter as defined in claim 8, wherein said skew angle is 0.1-0.11 degree.

10. A film slitter as defined in claim 8, further comprising an adjuster for adjusting skew of said first blade shaft relative to said second blade shaft.

11. A film slitter as defined in claim 4, wherein said clearance is 29.4-33.6 microns.

12. A film slitting method, comprising:

moving a wide film having a photosensitive emulsion layer to a slitting position;

slitting said wide film into a plurality of films of a narrow form in a film slitter, said film slitter being disposed in said slitting position, and including upper and lower rotary blades; and rotating said upper and lower rotary blades by a motor, wherein said upper and lower rotary blades contact one another in a position downstream in a running direction of said wide film, wherein a clearance is provided between said upper and lower rotary blades in a position upstream in said running direction, and wherein said motor rotates said upper and lower rotary blades such that respective upper and lower cutting edges of said upper and lower rotary blades move in a direction from said position upstream to said position downstream at a position where said wide film is sheared, and that said wide film is nipped between said upper and lower rotary blades, and then said wide film is sheared by said upper and lower cutting edges.

13. A film slitting method as defined in claim 12, wherein said clearance is provided in a film entering side of the film slitter.

14. A film slitting method as defined in claim 12, wherein said position upstream is provided in a film entering side of the film slitter.

15. A film slitting method as defined in claim 12, wherein the clearance on said position upstream forms slitted film edges that are non-perpendicular to a surface of the wide film.

* * * * *